United States Patent [19]

Kubota et al.

[11] Patent Number: 4,698,676

[45] Date of Patent: Oct. 6, 1987

[54] VIDEO SIGNAL CONTROL CIRCUIT

[75] Inventors: Tatsuya Kubota; Kenji Takanashi, both of Kanagawa, Japan

[73] Assignee: Sony Corporation, Tokyo, Japan

[21] Appl. No.: 850,551

[22] Filed: Apr. 11, 1986

[30] Foreign Application Priority Data

Apr. 15, 1985 [JP] Japan .................................. 60-079986

[51] Int. Cl.$^4$ .............................................. H04N 7/01
[52] U.S. Cl. ..................................... 358/140; 358/105; 358/160
[58] Field of Search ........................ 358/140, 160, 105

[56] References Cited

U.S. PATENT DOCUMENTS

| | | | |
|---|---|---|---|
| 4,346,405 | 8/1982 | Yoda | 358/160 |
| 4,403,250 | 9/1983 | Kellar | 358/105 |
| 4,458,266 | 7/1984 | Mahoney | 358/105 |
| 4,573,080 | 2/1986 | Maze | 358/140 |

Primary Examiner—Howard W. Britton
Attorney, Agent, or Firm—Hill, Van Santen, Steadman & Simpson

[57] ABSTRACT

A video signal control circuit having a memory, a write address generator for generating a write address data supplied to the memory, by which an input digital video signal is written in the memory at the address represented by the write address data, a read address generator for generating a read address data supplied to the memory, by which a controlled digital video signal is read out from the memory at the address represented by the read address data, an address comparator for comparing the write and read address data and for generating a compared output pulse, a timing pulse generator for generating first and second timing pulses, each of which has a predetermined pulse duration, a still picture detector supplied with the input digital video signal and for detecting whether the input digital video signal represents a still picture or not, a write address controller supplied with the compared output pulse, the first timing pulse and the output of the still picture detector and for controlling the write address generator when the pulse duration of the compared output pulse is shorter than that of said first timing pulse and the still picture detector detects that the input digital video signal represents a still picture, and a read address controller supplied with the compared output pulse, the second timing pulse and the output of the still picture detector and for controlling the read address generator when the pulse duration of the compared output pulse is shorter than that of the second timing pulse and the still picture detector means detects that the input digital video signal represents a still picture.

7 Claims, 49 Drawing Figures

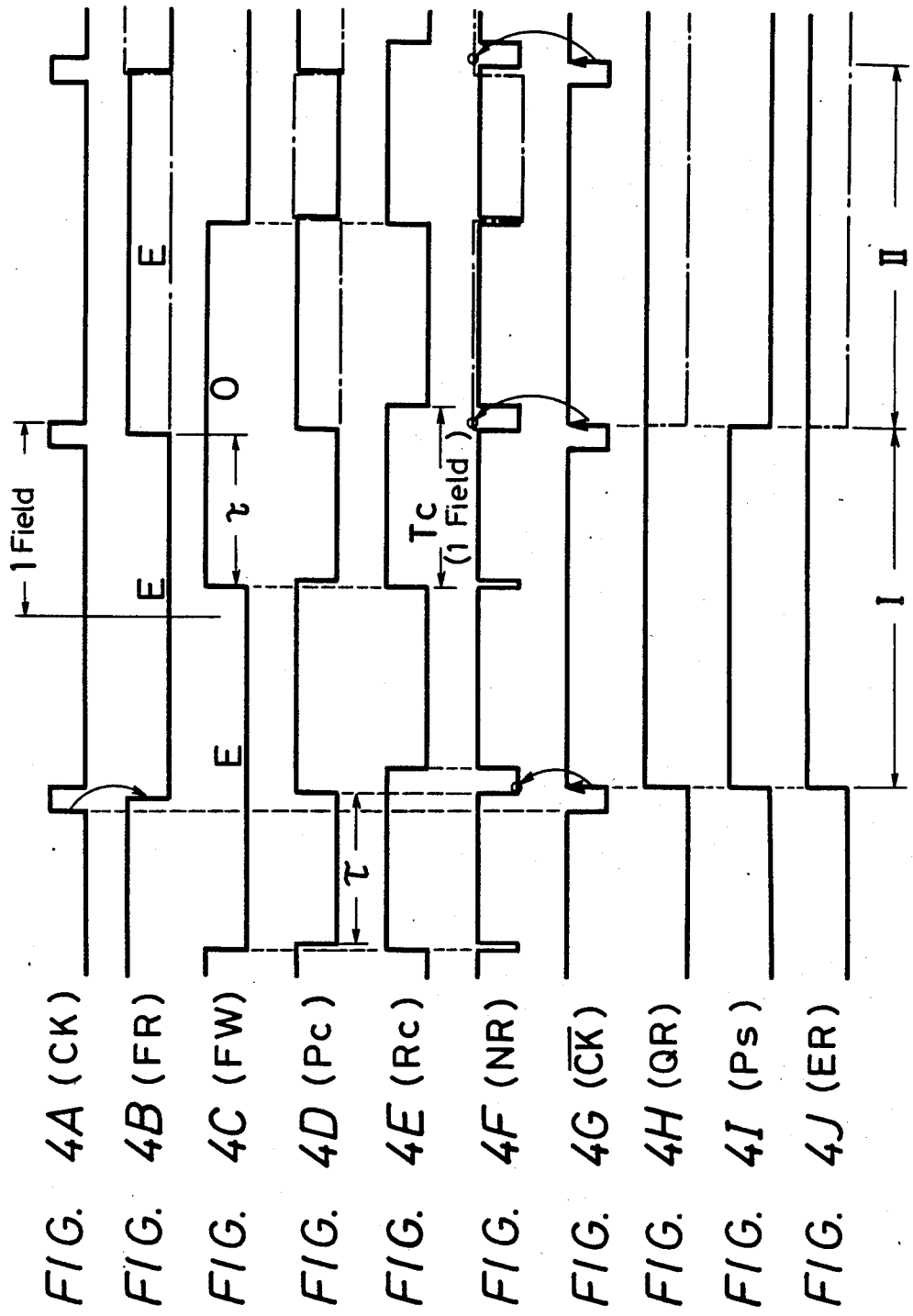

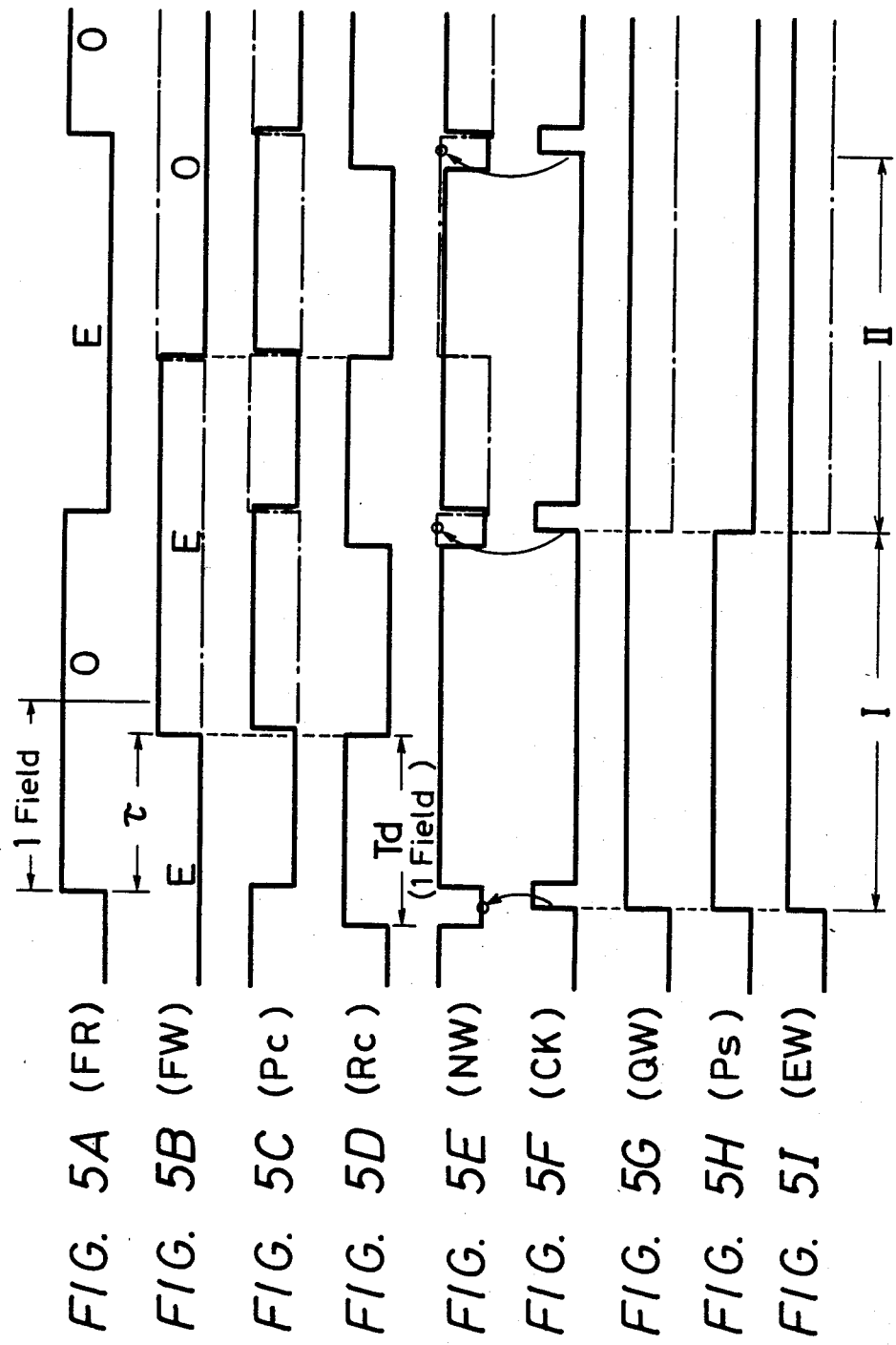

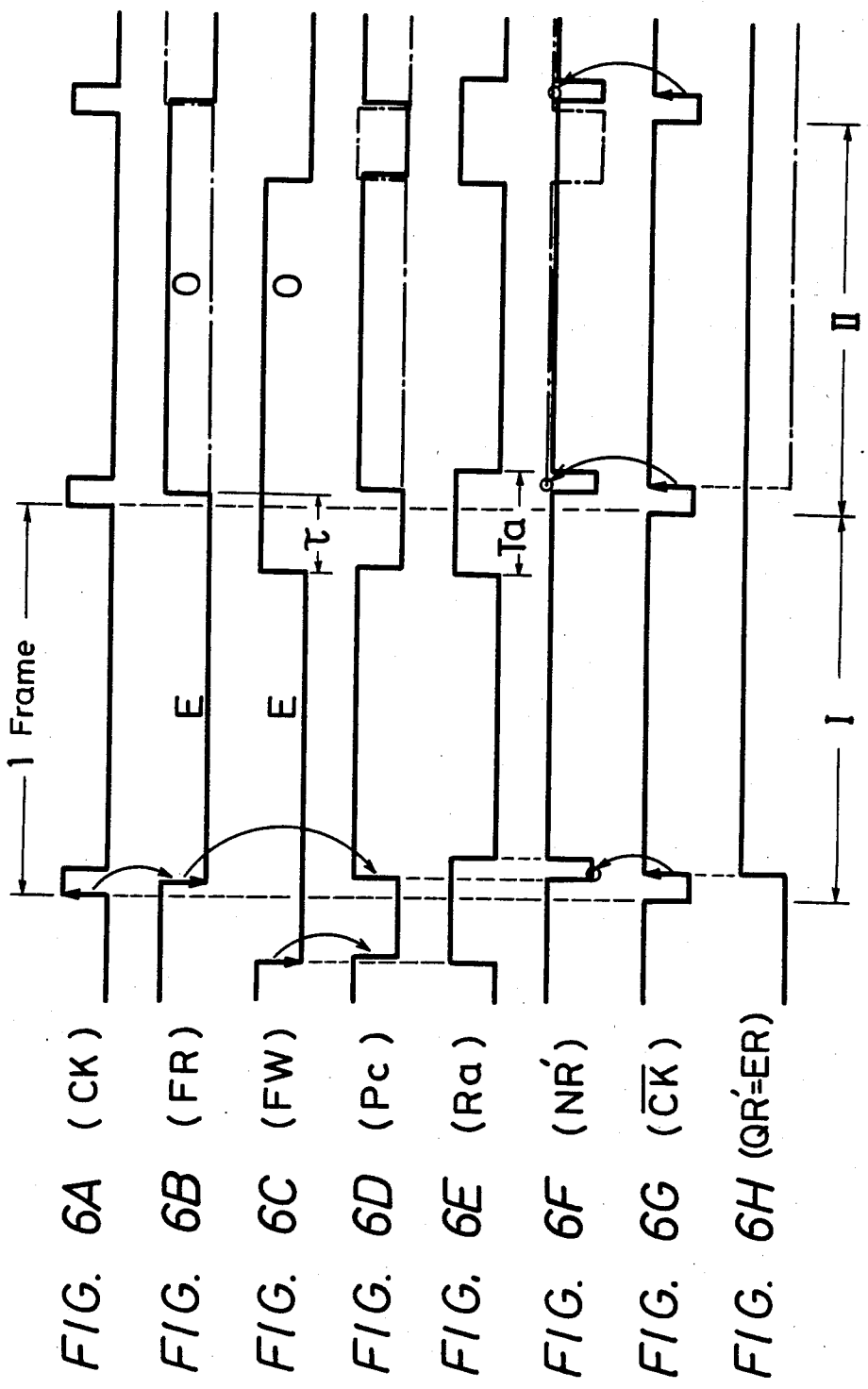

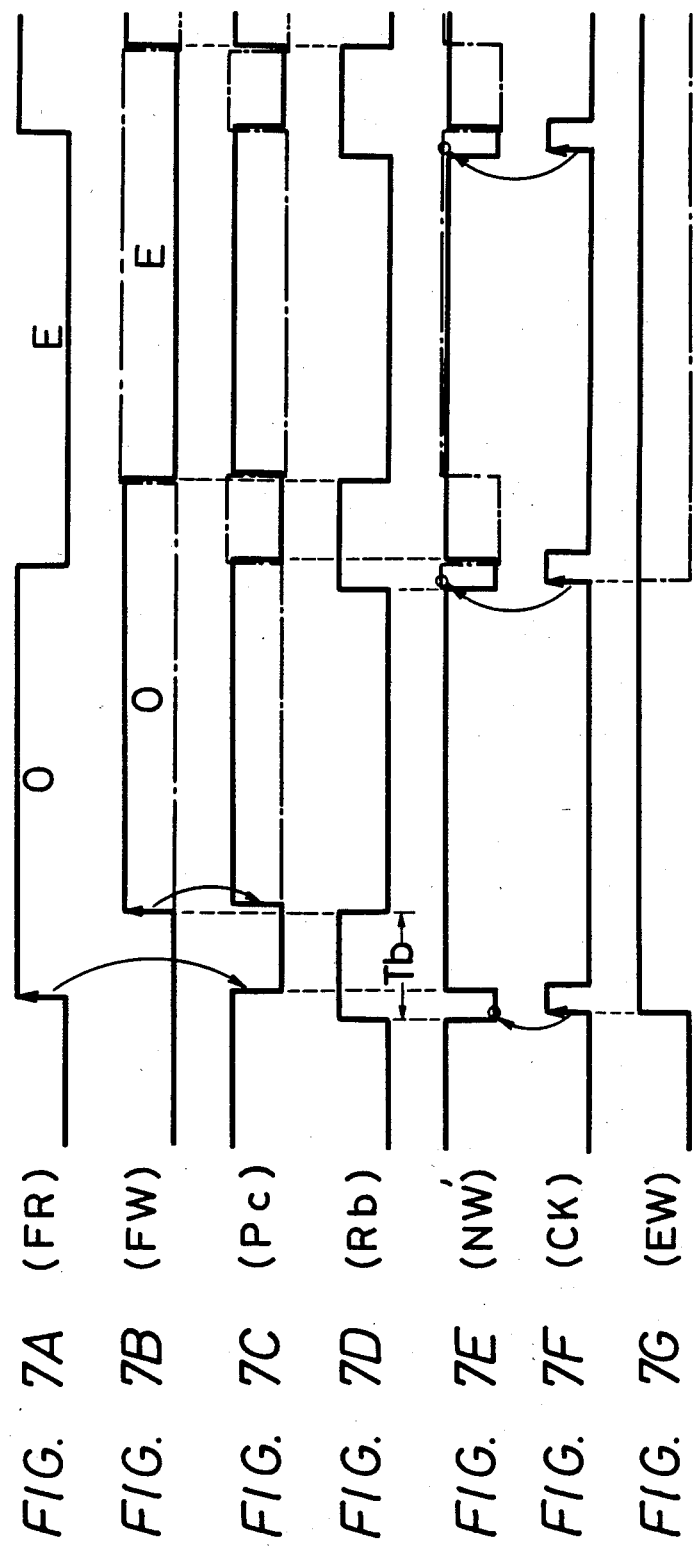

VIDEO SIGNAL CONTROL CIRCUIT

BACKGROUND OF THE INVENTION

1. Field of the Invention

The present invention relates generaly to a video signal control circuit and, more particularly, is directed to a video signal control circuit such as a frame synchronizer and the like for use with a so-called down converter which is used to convert a video signal having a number of scanning lines to a video signal having scanning lines according to a standard television system.

2. Description of the Prior Art

The number of scanning lines of a video signal to reproduce, for example, a high definition televison picture is about twice the number of a video signal according to the existing standard television system. When the video signal having a large number of scanning lines (e.g., video signal having 1125 horizontal scanning lines) is converted to a video signal (e.g., video signal having 625 horizontal scanning lines according to the PAL system) having scanning lines according to the existing standard television system, it is general that a so-called down converter is used for converting the number of horizontal scanning lines.

The down converter is provided with the frame synchronizer, in which the above mentioned input video signal is written in a frame memory and a data stored in the frame memory is read out therefrom in synchronism with an internal reference signal provided in the frame synchronizer whereby the number of horizontal scanning lines is reduced and an asynchronous input video signal is snychronized with the internal reference signal and then generated.

Since the input video signal is generaly not synchronized with the internal reference signal as described above, if in the writing and/or reading process in and-/or from the frame memory the frame memory is capable of storing an input video signal of about two frame periods, the frame memory has to carry out the reading after the writing was ended. As a result, the overlapping of the writing operation and the reading operation will take place about once at each day. In other words, if this overlapping state is left as it is, the timing relation between the writing operation and the reading operation will become closer. Thus, such a state that the writing and reading state, in which the writing and reading are impossible (overlapping state), will occur ultimately.

The reason for this is that the accuracy of a reference signal generator for an input video signal (in many cases, a crystal oscillator is used as the reference generator), accordingly, the accuracy of the crystal oscillator is different from that of a crystal osciallator that is provided in the internal reference signal generator.

In the prior art, when the overlapping of the writing operation and the reading operation occurs, for example, when the writing operation precedes the reading operation too much, a writing frame address (or field address) is stoped during one frame period to thereby delete a data of one picture amount. While, when on the other hand the reading operation precedes the writing operation too much, the data of the same picture is read out again from the overlapping frame to thereby prevent the skipping of the memory.

For example, if the write timing delays as to the read timing, as shown in FIGS. 1A and 1B, the write timing (shown by a write address data, WADRS, in the illustrated example) approaches gradually the read timing (shown by R.ADRS) and at last, the write timing and the read timing coincide with each other. For this reason, if the write timing tends to be delayed as mentioned above, when both the write timing and the read timing approach to each other with a minimum approaching distance in which the data can not be read, that is, with a minimum timing distance Ta therebetween, a read address generator is controlled to be placed in the re-reading mode under which the same frame data is read out again.

Conversely, if the write timing precedes the read timing, the write timing approaches gradually the read timing as shown in FIGS. 1C and 1D so that the write timing and the read timing become coincident with each other ultimately. For this reason, if the writing timing tends to precede the read timing as described above, when both the write timing and the read timing approach to each other with a minimum timing distance Tb in which the data can not be written, the write address generator is controlled to be placed in the re-writing mode under which the same frame data is written once again.

In order to control the write mode and the read mode, frame pulses FR and FW (shown in FIGS. 2A and 2B) of 2 frame periods are formed from the write address data and the read address data, respectively. On the basis of a point at which the write frame pulse FW changes, there are respectively formed pulses Ra and Rb shown in FIGS. 2E and 2F. One pulse Ra is used to detect the mode in which the data is read out again so that its pulse width or pulse duration is set to be the distance Ta in which the data can not be read out as described above. Similarly, another pulse Rb is used to detect the mode in which the data is written in again. The pulse duration of the pulse Rb is set to be the distance Tb.

By the way, in the prior art, if the overlapping relation between the write timing and the read timing occurs within the data writing disabled spacing Ta and the data reading disabled spacing Tb, the writing and/or reading address generator is controlled immediately so as to stop the writing mode or to execute the re-reading mode. As a result, this overlapping state frequently takes place in the necessary picture. At that time, if the address generator is controlled so as to delete the data or one frame period or to read the same picture data of one frame period again, an unnatural motion occurs in the animation except for the still picture.

OBJECTS AND SUMMARY OF THE INVENTION

Accordingly, it is an object of this invention to provide an improved video signal control circuit which can remove the defects encountered with a prior art video signal control circuit.

It is another object of this invention to provide a video signal control circuit in which when the writing mode or reading mode is controlled before the overlapping state of the write and read timings occurs, an unnatural motion can be prevented from occurring even in the animation by skillfully controlling the control timing of the write or read address generator.

It is further object of this invention to provide a video signal control circuit which can be applied not only to a frame synchronizer used as a down converter for converting the number of scanning lines but also to a frame synchronizer which synchronizes an asynchronous input video signal with an internal referene signal.

According to one aspect of the present invention, there is provided a video signal control circuit having a memory in which an input digital video signal is written and from which a controlled digital video signal is read out, and a memory control circuit, said video signal control circuit comprising:

(A) write address generating means for generating a write address data supplied to said memory, and said input digital video signal being written in the address represented by said write address data;

(B) read address generating means for generating a read address data supplied to said memory, and said controlled digital video signal being read out from the address represented by said read address data;

(C) address comparator means for comparing said write and read address data and for generating a compared output pulse;

(D) timing pulse generating means for generating first and second timing pulses, each of said timing pulses having a predetermined pulse duration;

(E) still picture detecting means supplied with said input digital video signal and for detecting whether said input digital video signal represents a still picture or not;

(F) write address control means supplied with said compared output pulse, said first timing pulse and the output of said still picture detecting means, and for controlling said write address generating means when the pulse duration of said compared output pulse is shorter than that of said first timing pulse and said still picture detecting means detects that said input digital video signal represents a still picture; and (G) read address control means supplied with said compared output pulse, said second timing pulse and the output of said still picture detecting means, and for controlling said read address generating means when the pulse duration of said compared output is shroter than that of said second timing pulse and said still picture detecting means detects that said input digital video signal represents a still picture.

These and other objects, features and advantages of the present invention will become apparent from the following detailed description of the preferred embodiment taken in conjuction with the accompanying drawings, throughout which like reference numerals designate like elements and parts.

BRIEF DESCRIPTION OF THE DRAWINGS

FIGS. 4A to 4J and FIGS. 6A to 6H are waveform diagrams respectively used to explain the read address control operation; and FIGS. 5A to 5I and FIGS. 7A to 7G are waveform diagrams respectively used to explain the write address control operation.

DESCRIPTION OF THE PREFERRED EMBODIMENT

Now, an embodiment of a video signal control circuit according to the present invention will hereinafter be described with reference to the attached drawings. In this case, the present invention is applied, by way of example, to a frame synchronizer.

Figure 3:
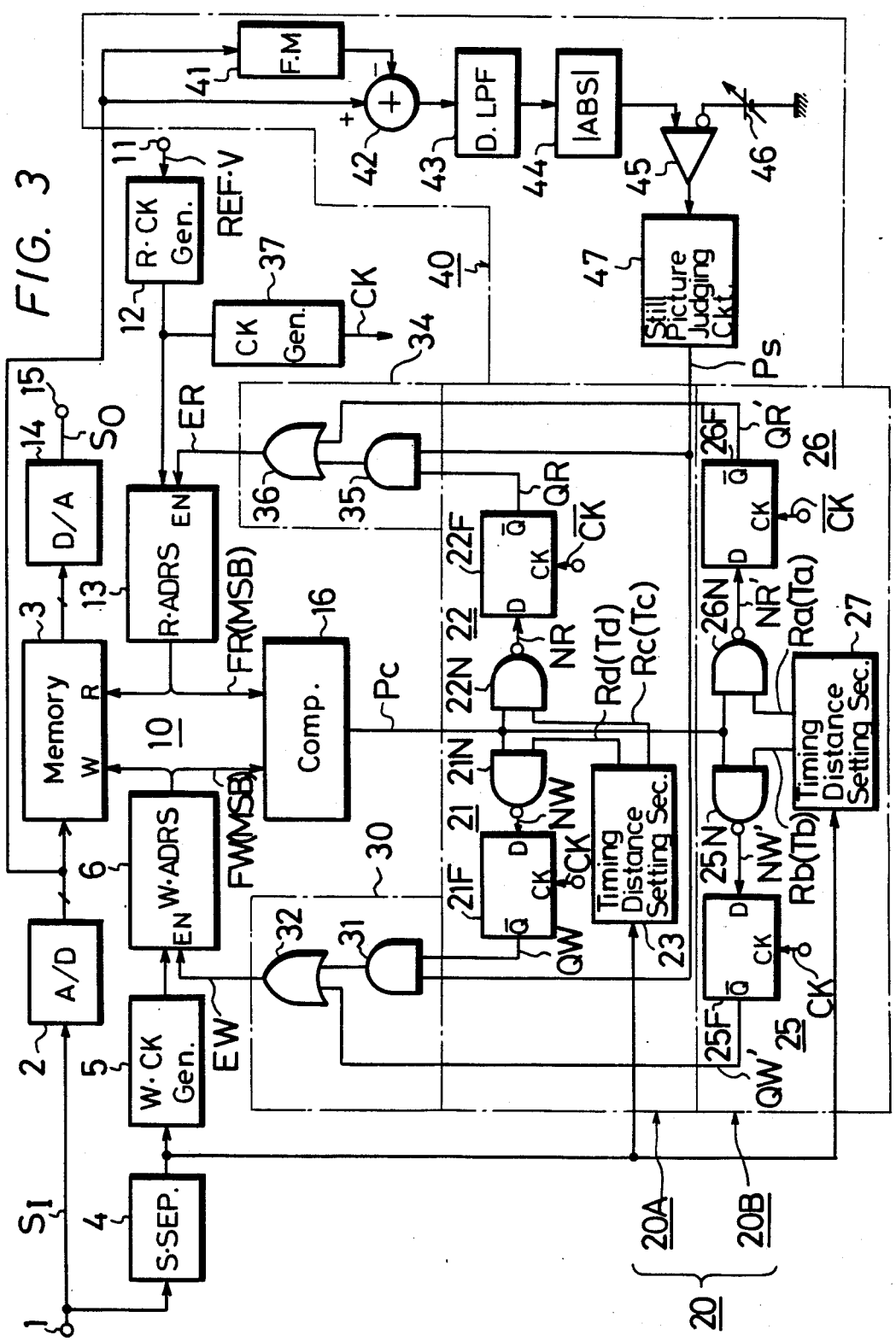
FIG. 3 is a circuit block diagram showing one embodiment of a video signal control circuit according to this invention which is applied to a frame synchronizer.

FIG. 3 is a systematic block diagram showing an overall circuit arrangement of a frame synchronizer to which this invention is applied. In this embodiment, the frame synchronizer is used as a frame synchronizer of the above mentioned down converter for converting the number of the scanning lines of the video signal.

In FIG. 3, reference numeral 10 generally designates such frame synchronizer. An interlaced-scanning input video signal $S_I$ applied to an input terminal 1 is supplied to an A/D (analog-to-digital) converter 2 in which it is converted to, for example, an 8-bit digital signal and then fed to a frame memory 3. The input video signal $S_I$ from the input terminal 1 is further supplied to a synchronizing signal separating circuit 4 in which horizontal and vertical synchronizing pulses are separated from the video signal $S_I$. These horizontal and vertical synchronizing pulses are supplied to a write clock generator 5 which then generates a write clock having a predetermined frequency that is synchronized with the horizontal and vertical pulses. This write clock is supplied to a write address generator 6 so that on the basis of the write address therefrom, the digitally-converted input video signal $S_I$ is written in the frame memory 3.

While, a reference vertical synchronizing signal REF V applied to a terminal 11 is supplied to a read clock generator 12 which then generates a read clock having a predetermined frequency. This read clock from the read clock generator 12 is supplied to a read address generator 13 from which a predetermined read address is derived. Accordingly, on the basis of the resulting read address the frame memory 3 is driven and then the digital video signal is read out therefrom in synchronism with the reference vertical synchronizing signal REFV. The digital video signal thus read is supplied to and converted to an analog signal by a D/A (digital-to-analog) converter 14 at the rear stage with the result that an output video signal $S_O$ synchronized with the internal reference signal is developed at a terminal 15.

According to the present invention, such frame synchronizer 10 is provided with a data comparator 16, an address control circuit 20 for controlling the writing in and/or reading out from the frame memory 3 and a still picture detecting circuit 40.

Since the writing in and/or reading out from the frame memory 3 is carried out at the frame period, in order to detect this frame period, of the respective address data generated from the write and read address generators 6 and 13, there are used pulses FW and FR indicative of MSB (most significant bit) data as frame informations. These pulses FW and FR are both supplied to the data comparator 16 in which they are compared with each other and from which generated is a difference Pc between the write timing and the read timing. This compared pulse Pc indicative of the timing difference is supplied to the address control circuit 20. While the address control circuit 20 is formed of first and second address control circuits 20A and 20B, it is sufficient to use only the first address control circuit 20A in principle as will be described later. Therefore, the first address control circuit 20A will be described first. The first address control circuit 20A comprises a write address control section 21, a read address control section 22 and a timing distance setting section 23 which sets the above mentioned timing distances Tc and Tb.

The write address control section 21 is formed of a NAND circuit 21N and a D-type flip-flop circuit 21F and also the read address control section 22 is formed of a NAND circuit 22N and a D-type flip-flop circuit 22F. The compared pulse Pc is supplied commonly to the NAND circuits 21N and 22N, while a first pulse Rc having a pulse duration Tc set by the timing distance setting section 23 is supplied to the NAND circuit 22N and a second pulse Rd having a pulse duration Td also set by the setting section 23 is supplied to the NAND circuit 21N.

Figure 1:
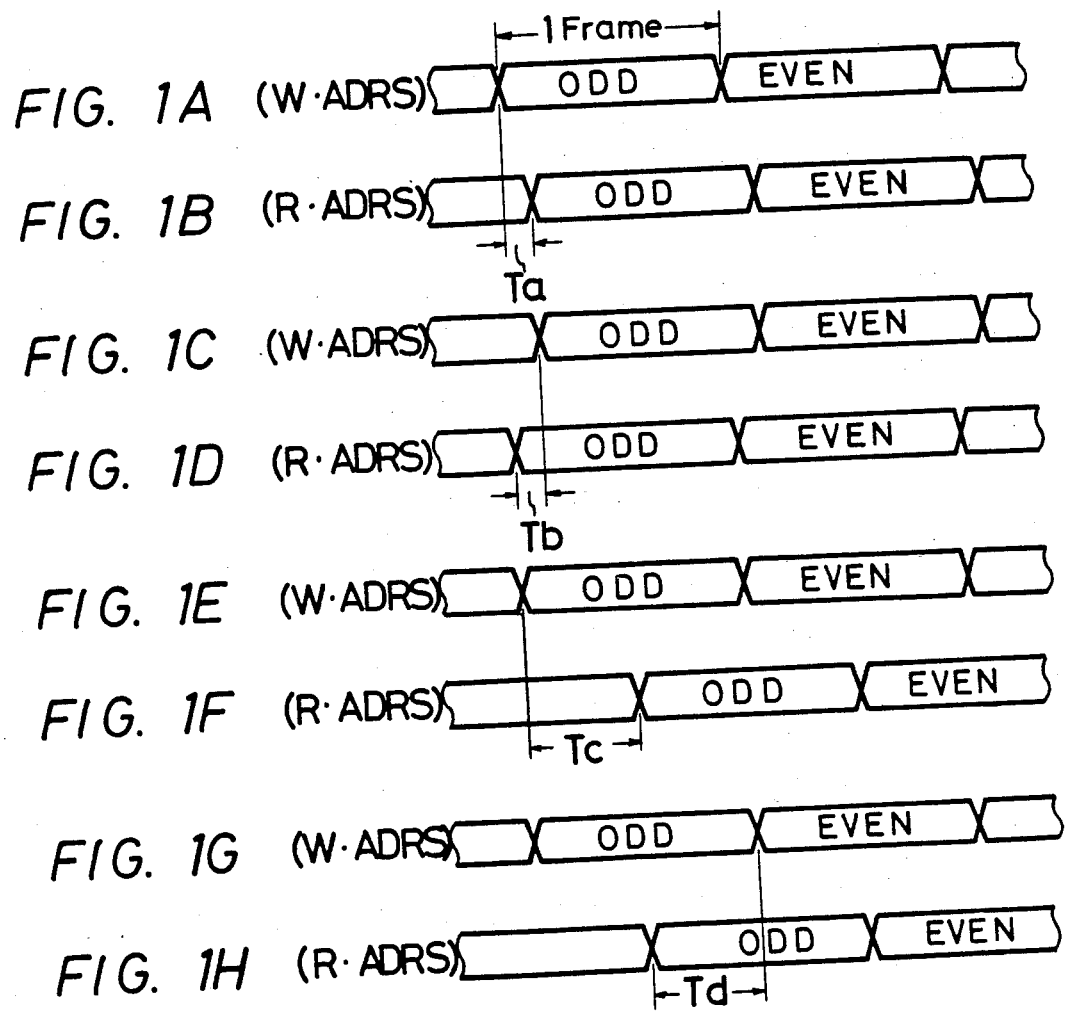
FIGS. 1A to 1H are diagrams respectively used to explain an overlapping state between a read timing and a write timing.
Figure 2:
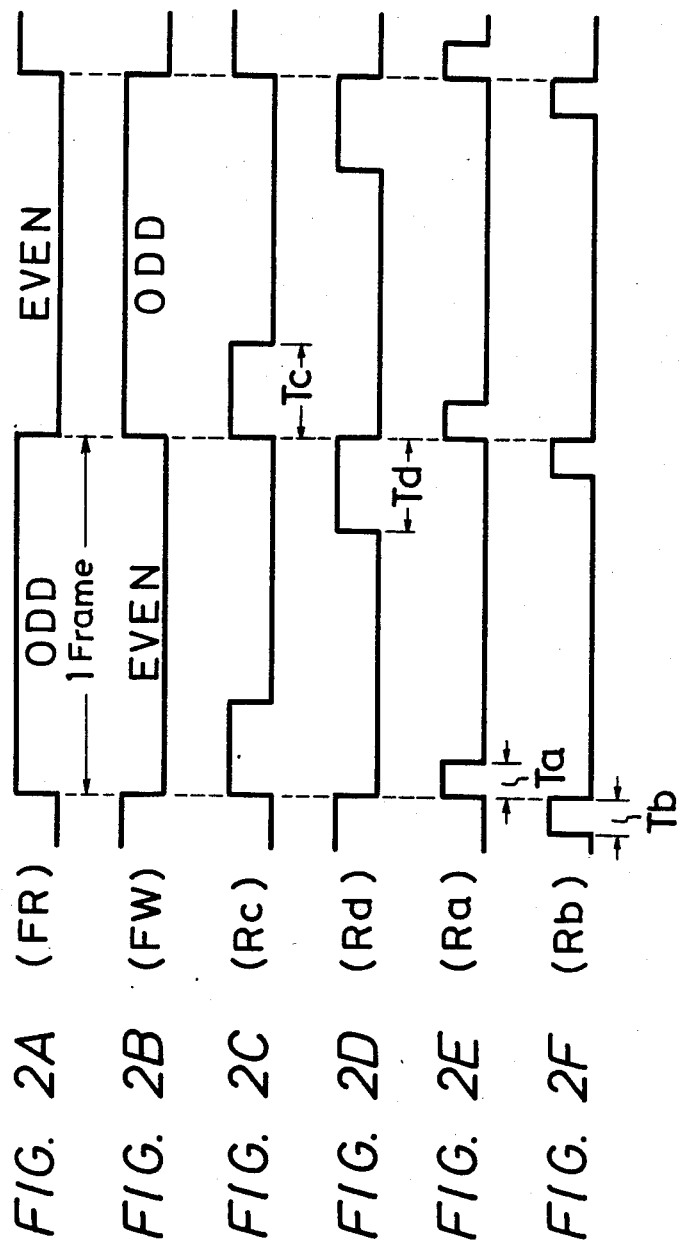
FIGS. 2A to 2F are waveform diagrams respectively used to explain how to determine the timing distance and a pulse duration of a timing pulse.

While the timings at which these first and second pulses Rc and Rd are generated are respectively formed at the advanced-phase side and the delayed-phase side with a point at which the pulse FW is changed as shown in FIG. 2, their pulse durations Tc and Td may be either the same or different. In this embodiment, the pulse durations Tc and Td are selected to be the same. Further, in this embodiment, Tc=Td=1 field period is satisfied.

NAND outputs NW and NR from the NAND circuits 21N and 22N are respectively supplied to the corresponding flip-flop circuits 21F and 22F and thereby first and second control pulses QW and QR are generated at respective inverting output terminals $\overline{Q}$ of these flip-flop circuits 21F and 22F. The first control pulse QW is supplied to an AND gate circuit 31 which constructs a first gate circuit 30, while the second control pulse QR is supplied to an AND gate circuit 35 which constructs a second gate circuit 34.

The second address control circuit 20B is formed in the same way as the first address control circuit 20A. Accordingly, the second address control circuit 20B comprises address control sections 25 and 26, and the address control sections 25 and 26 are respectively formed of a pair of AND circuits 25N and 26N and a pair of D-type flip-flop circuits 25F and 26F. The compared pulse Pc is supplied commonly to the NAND circuits 25N and 26N and third and fourth pulses Ra and Rb, each of which is generated from a timing distance setting section 27, are respectively supplied to the corresponding NAND circuits 25N and 26N.

The pulse duration of the third pulse Ra is set to be a minimum timing distance Ta (FIG. 2E) that indicates a region in which the reading is disable. While, the pulse duration of the fourth pulse Rb is set to be a minimum timing Tb (FIG. 2F) that indicates a region in which the writing is disable. The durations of the minimum timing distances Ta and Tb are both selected to be about one horizontal period and may be selected to be the same or different. In this embodiment, they are selected to be the same.

A third control pulse QW' derived from the inverting output terminal $\overline{Q}$ of the flip-flop circuit 25F is supplied to an OR gate circuit 32 provided in the first gate circuit 30 together with an output of the NAND gate circuit 31. The gating output from the OR gate circuit 32 is supplied to the write address generator 6 as an enable pulse EW.

Similarly, a fourth control pulse QR' derived from the inverting output terminal $\overline{Q}$ of the other flip-flop circuit 26F is supplied to an OR gate circuit 36 provided in the second gate circuit 34 together with an output of the NAND gate 35. The gating output from the OR gate circuit 36 is supplied to the read address generator 13 as an enable pulse ER.

The writing mode and the reading mode are controlled by the enable pulses EW and ER, respectively. As clocks applied to the clock terminals CK of the flip-flop circuits 21F and 22F, there are used clocks CK and $\overline{CK}$ of the frame period which are opposed in phase to generate the read address data. These clock CK and $\overline{CK}$, each having the frame period, are generated from a clock generator 37.

Further, in the still picture detecting circuit 40 which is supplied with the digital video signal from the A/D converter 2, a one frame-preceding video signal (digital signal) delayed by a one frame memory 41 and a video signal of the current frame are supplied to an adder 42 in which they are added with illustrated polarities (FIG. 3) and thereby detected as a motion information signal indicative of the motion between the adjacent two frames. This motion information signal is supplied through a low pass filter 43, which removes a noise component or the like from the motion information signal, to an absolute value level forming circuit 44 which then produces the absolute value of the motion information signal.

The motion information signal presented as the absolute value is supplied to a comparator 45 in which it is compared with a reference voltage (digital signal) having a predetermined level from the voltage source 46. Since the level of the motion information signal is large in the case of an animation, while the level of the motion information signal is small in a still picture or an animation that can be regarded as a still picture, in this embodiment, the above mentioned reference voltage is set to be a voltage near the level of the motion information signal that is provided when the animation can be substantially regarded as the still picture. If the reference voltage is selected to be such value, in the case of the animation, the compared output becomes "H" (high) in level, while in the case of the still picture, the compared output becomes "L" (low) in level.

Since video signals processed in this embodiment are all digitized data, the above mentioned level comparing operation is executed at every sampling operation per one picture, thus the compared output being obtained at the sampling unit.

The compared output from the comparator 45 is supplied to a still picture discriminating or judging circuit 47 in which with respect to the level or value (H or L) of the compared output obtained at one frame period, when the number of the compared output showing the level (L) in this embodiment is less than a predetermined value, such frame is judged as the level indicative of the animation; while when it is more than the predetermined value, such frame is judged as the still picture. When the value of the compared output is judged as the still picture, the still picture judging circuit 47 generates a detected output Ps having the level "H". The detected output (whose duration is one frame period) Ps provided when the compared output is judged as being indicative of the still picture is supplied commonly to the above mentioed AND gate circuits 31 and 35.

Subsequently, the operation of the frame synchronizer 10 thus being constructed will be discussed mainly with reference to the state being the overlapping state between the read timing and the write timing occurs. FIGS. 4A to 4J are respectively waveform diagrams used to explain the read address control operation under the state that the write address is delayed from the read address. In FIG. 4, a solid line indicates a waveform before the read address generator 13 is controlled to be set in the re-reading mode; and one-dot chain line indicates a waveform after the read address generator 13 is already controlled to be placed in the re-reading mode.

Although the pulse FR (FIG. 4B), which is supplied to the comparator 16, is generated in synchronism with the frame clock CK (synchronized with the MSB data of the read address data), the pulse FR is generated after the frame clock CK with a small delay in a time. When the comparator 16 is supplied with the pulses FR and FW (FIGS. 4B and 4C) which show that the distance between the write and read timings is close to, it generates the compared pulse Pc (FIG. 4D) which indicates the points at which the pulses FR and FW are changed, respectively.

On the other hand, the timing distance setting section 23 generates the first and second pulses Rc and Rd having the predetermined timing distances Tc and Td which are determined beforehand. These first and second pulses Rc and Rd are respectively supplied to the corresponding NAND circuits 21N and 22N together with the compared pulse Pc so that when the pulse duration $\tau$ is shorter than the pulse duration Tc of the first pulse Rc as shown in FIGS. 4D and 4E, the NAND output NR (FIG. 4F) is derived from the NAND circuit 22N. At that time, since the flip-flop circuit 22F is supplied with the clock $\overline{CK}$ (FIG. 4G) having the phase inverted, if the flip-flop circuit 22F latches the input data at the leading edge of the clock $\overline{CK}$, the second control pulse QR which is the output of the flip-flop 22F is inverted to "H" in level (FIG. 4H).

Under the state that the distance between the write timing and the read timing is close to each other and the pulse duration $\tau$ of the compared pulse Pc is shorter than the pulse duration Tc of the first pulse Rc as described above, if the video signal applied to the input terminal 1 is the video signal of the animation, the detected output Ps (FIG. 4I) of the still picture detecting circuit 40 is "L" in level. However, even in the animation, in most cases, there exists still picture having a period over several frames. As mentioned above, the still picture which is seen as the animation on the whole but which exists in the very short period over several frames is detected by the still picture detecting circuit 40.

For convenience sake of explanation, when the still picture is detected in the current frame of the period I (FIG. 4), the detected output Ps (FIG. 4I) which becomes "H" only during the period I is produced. The AND gate circuit 35 is turned on by this detected output Ps and the second control pulse OR is supplied thrugh this AND gate circuit 35 to the QR gate circuit 36 so that the OR gate circuit 36 generates the enable pulse ER which is shown in FIG. 4J.

By the inversion of this enable pulse ER, the read address generator 13 is controlled so that also the period II in succession to the period I, the read mode of the same frame, that is, even frame in this embodiment (shown by one-dot chain line in FIG. 4B) is presented.

As a result, during the period II, the compared pulse Pc is inverted to "L", the NAND output NR is inverted to "H", accordingly, the second control pulse Rc is inverted to "L" respectively (shown by one-dot chain lines in FIGS. 4D, 4F and 4H). Further, since the detected output Ps is at level "H" only during the period I, the enable pulse ER is inverted to "L" from the level relationship thereamong so that only during the period II, the read address generator 13 is controlled so as to be set in the re-reading mode.

When the write timing is gradually delayed and the pulse duration $\tau$ of the compared pulse Pc becomes shorter than the timing distance Tc of the first pulse Rc and only when the detected output Ps is obtained, during the frame period II succeeding to the period I in which the detected output Ps is obtained, the read address generators 13 is controlled so as to set in the re-reading mode.

Since the clock CK (FIG. 4A) is supplied to the first flip-flop circuit 21F, the first control pulse QW (not shown), which is generated from its inverting output terminal $\overline{Q}$ is at level "L". Thus, even when the detected output Ps is at level "H", the enble pulse EW remains at level "L" and hence the write address generator 6 is not controlled.

On the contrary, when the write timing is gradually advanced, if the pulse duration $\tau$ of the compared pulse Pc becomes shorter than the pre-set timing distance Td as shown in FIG. 5, the resulting NAND output NW from the NAND circuit 21N is latched by the flip-flop circuit 21F at the trailing edge of the clock CK so that the first control pulse QW from the flip-flop circuit 21F is inverted to the level "H" (FIG. 5G). Under this state, if the detected output Ps (FIG. 5H) is generated, the enable pulse EW is inverted to the level "H" for the first time so that the write address generator 6 is controlled to be placed in the re-writing mode only during the period I. As a result, the information of one frame amount is made useless.

By the way, the explanation has been given so far to the operaton of the case where the still picture is detected under the state that the timing relation is established as $t < Tc$ and Td. Even in the above mentioned timing relationships, there may be a possibility that the still picture will not be detected at all. In such case, if some countermeasure is not taken, the writing or reading will become impossible.

Therefore, in this embodiment shown in FIG. 3, the second address control circuit 20B is provided for the purpose of coping with such case. When the write timing is delayed and the distance $\tau$ becomes shorter than the minimum timing distance Ta indicative of the read-disabled region as shown in FIGS. 6B and 6C, the compared pulse Pc shown in FIG. 6D is generated. As described above, when the pulse duration $\tau$ of the compared pulse Pc becomes shorter than the pulse duration Ta (FIG. 6E) of the third pulse Ra, since the level of the NAND output NR' (FIG. 6F), which is latched by the clock $\overline{CK}$ (FIG. 6G), is at level "L", the fourth control pulse QR' (FIG. 6H) is inverted to the level "H" (FIG. 6H). Thus, the read address generator 13 is controlled so as to be placed in the re-reading mode similarly as described above.

In this case, the one frame amount of the animation is utilized again and this is unavoidable.

When the write timing is advanced and the timing distance $\tau$ becomes shorter than the minimum timing distance Tb indicative of the write-disable region, the write address control section 25 is operated and hence, the writing mode is controlled by the third control pulse QW'. FIGS. 7A to 7G are waveform diagrams respectively used to explain this operation. In this case, the detailed explanation thereof will be omitted for simplicity.

If the first and second control pulses QW and QR are calculated in the logical OR-fashion and then fed to display means though not shown, it is possible to visually confirm the fact that the distance between the write and read timings becomes shorter than the pre-determined timing distances Tc and Td.

In like manner, if the third and fourth control pulses QW' and QR' are calculated in the logical OR-fashion and then delivered to the display means, it is possible to visually confirm the fact that the distance between the write and read timings becomes shorter than the minimum timing distances Ta and Tb each of which indicates the write-disabled region.

According to the present invention as set forth above, particularly when the write start timing and the read start timing approach to each other gradually and the distance between the approached write and read start timings is entered into the pre-determined timing distances Tc and Td and under this timing relationship only when the still picture is detected, the write address generator 6 or the read address generator 13 is controlled so as to execute the deletion or to carry out the re-reading of the same frame data. Accordingly, the data is deleted or utilized again by the use of the data concerning the still picture so that it becomes possible to remove an unnatural motion occurring when the data is deleted or the data is utilized again.

In addition, according to the present invention, since the above mentioned control can be carried out automatically, the detection of the still picture can be carried out with high accuracy than that of the manual operation. Therefore, even when the data is deleted or utilized again, the motion of the picture becomes more natural.

The above description is given on a single preferred embodiment of the invention but it will be apparent that many modifications and variations could be effected by one skilled in the art without departing from the spirits or scope of the novel concepts of the invention so that the scope of the invention should be determined by the appended claims only.

We claim as our invention:

1. A video signal control circuit having a memory in which an input digital video signal is written and from which a controlled digital video signal is read out, and a memory control circuit, said video signal control circuit comprising:
   (A) write address generating means for generating a write address data supplied to said memory, and said input digital video signal being written in the address represented by said write address data;
   (B) read address generating means for generating a read address data supplied to said memory, and said controlled digital video signal being read out from the address represented by said read address data;
   (C) address comparator means for comparing said write and read address data and for generating a compared output pulse;
   (D) timing pulse generating means for generating first and second timing pulses, each of said timing pulses having a predetermined pulse duration;
   (E) still picture detecting means supplied with said input digital video signal and for detecting whether said input digital video signal represents a still picture or not;
   (F) write address control means supplied with said compared output pulse, said first timing pulse and the output of said still picture detecting means, and for controlling said write address generating means when the pulse duration of said compared output pulse is shorter than that of said first timing pulse and said still picture detecting means detects that said input digital video signal represents a still picture; and
   (G) read address control means supplied with said compared output pulse, said second timing pulse and the output of said still picture detecting means, and for controlling said read address generating means when the pulse duration of said compared output pulse is shorter than that of said second timing pulse and said still picture detecting means detects that said input digital video signal represents a still picture.

2. A video signal control circuit according to claim 1, wherein said write address generating means is controlled by a vertical synchronizing signal of said input digital video signal and said read address generating means is controlled by a reference signal, and said memory is capable of storing said input digital video signal of two frame periods.

3. A video signal control circuit according to claim 1, wherein said still picture detecting means includes a subtracter for subtracting a one frame delayed digital video signal from the input digital video signal, a comparator for comparing the output of said subtracter with a reference level, and a discriminator for discriminating the output of said comparator and for generating the output.

4. A video signal control circuit according to claim 1, wherein said address comparator means compares the pulses representing MSBs (most significant bits) of said write and read address data.

5. A video signal control circuit according to claim 4, wherein each of said write and read address control means includes a first AND gate supplied with the output of said address comparator means and a first or second timing pulse, a flip-flop circuit supplied with the output of said first AND gate, and a second AND gate supplied with the output of said flip-flop circuit and the output of said still picture detecting means.

6. A video signal control circuit according to claim 4, wherein each of said write and read address control means further includes a third AND gate supplied with the output of said address comparator means and a third or fourth timing pulse whose pulse duration is shorter than that of said first or second timing pulse, flip-flop means supplied with the output of said third AND gate means, and OR gate means supplied with the outputs of said second AND gate and said flip-flop means.

7. A video signal control circuit according to claim 1, wherein said timing pulse generating means is controlled by a vertical synchronizing signal of said input digital video signal.

* * * * *